Figure 1:
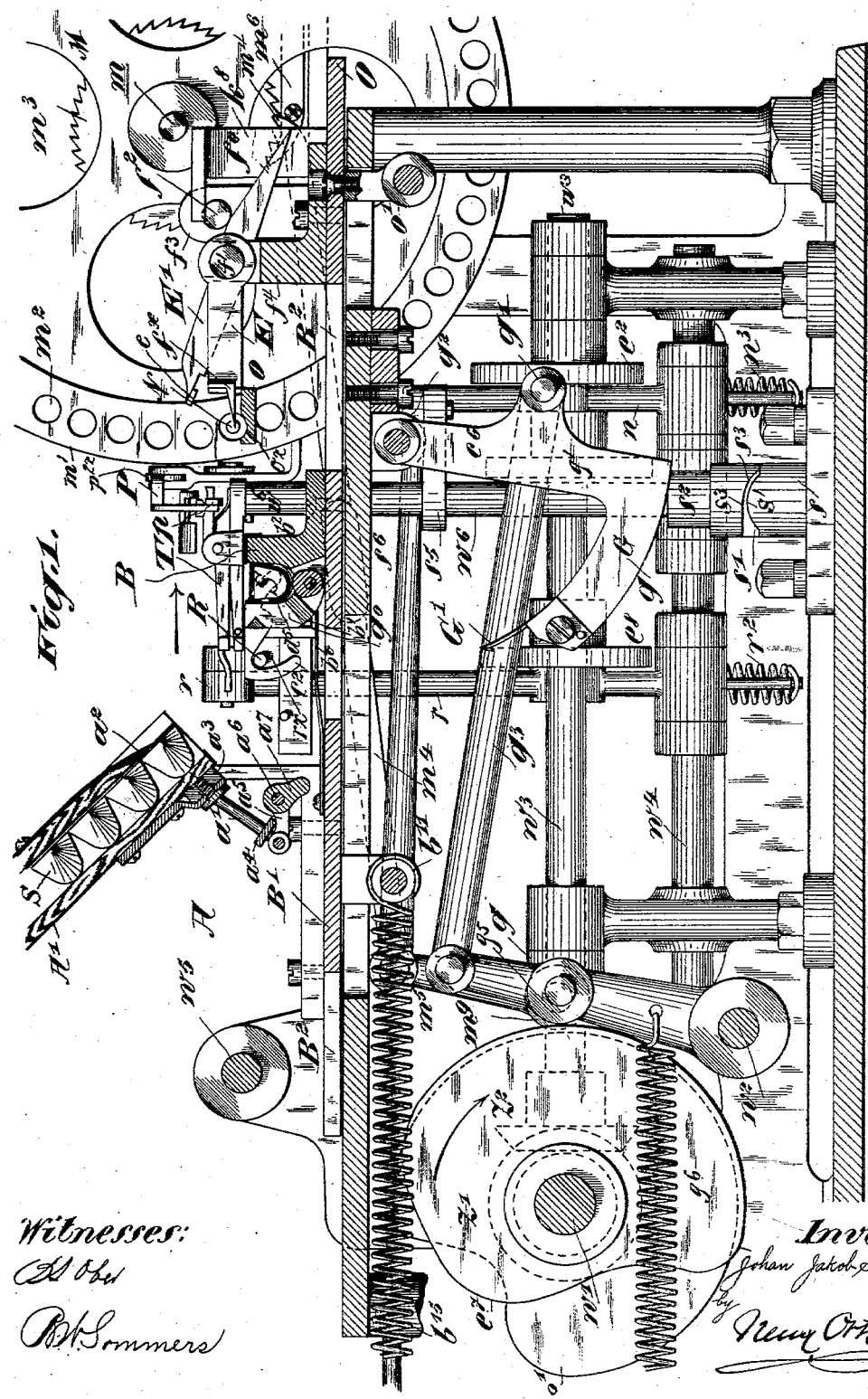

No. 629,308. Patented July 18, 1899.
J. J. SONDEREGGER.
MACHINE FOR INSERTING BOBBINS IN SHUTTLES.
(Application filed July 23, 1898.)
(No Model.) 9 Sheets—Sheet 2.

Witnesses:
Inventor:
Johan Jakob Sonderegger
by Henry Orth
Atty.

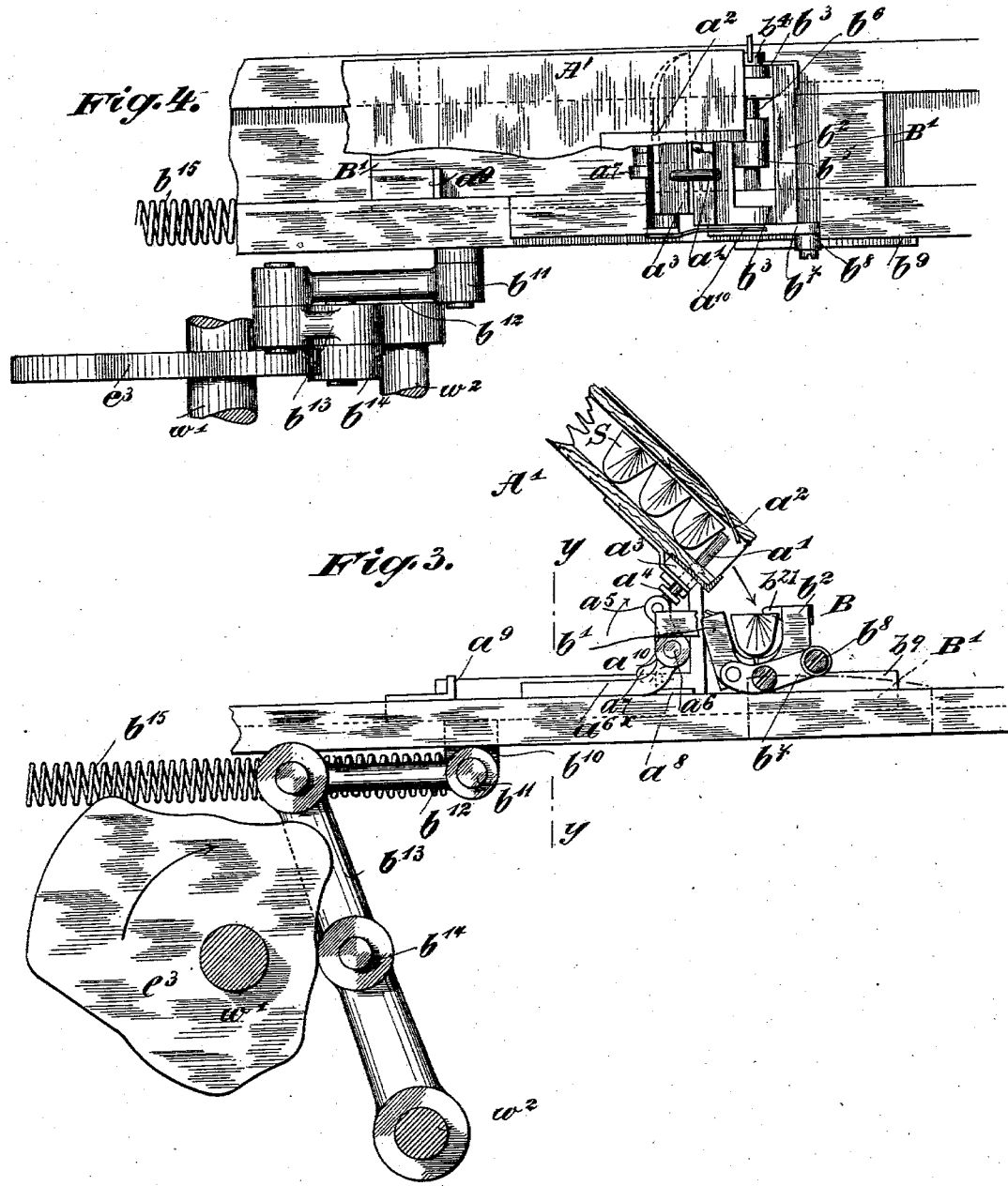

No. 629,308. Patented July 18, 1899.
J. J. SONDEREGGER.
MACHINE FOR INSERTING BOBBINS IN SHUTTLES.
(Application filed July 23, 1898.)
(No Model.) 9 Sheets—Sheet 4.
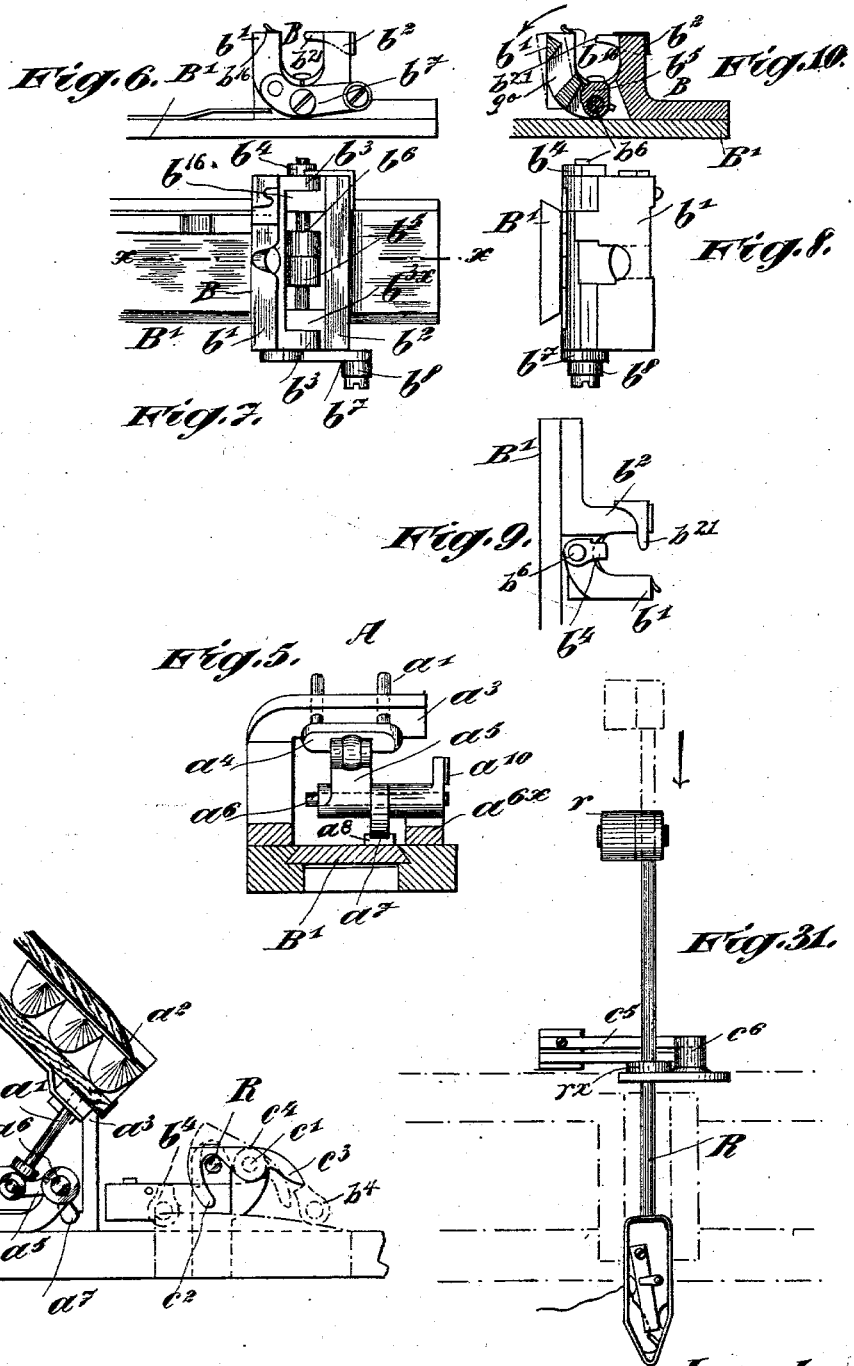
Witnesses:
Inventor:
Johan Jakob Sonderegger
by
Henry Orth
Atty.

No. 629,308. Patented July 18, 1899.
J. J. SONDEREGGER.
MACHINE FOR INSERTING BOBBINS IN SHUTTLES.
(Application filed July 23, 1898.)
(No Model.) 9 Sheets—Sheet 5.
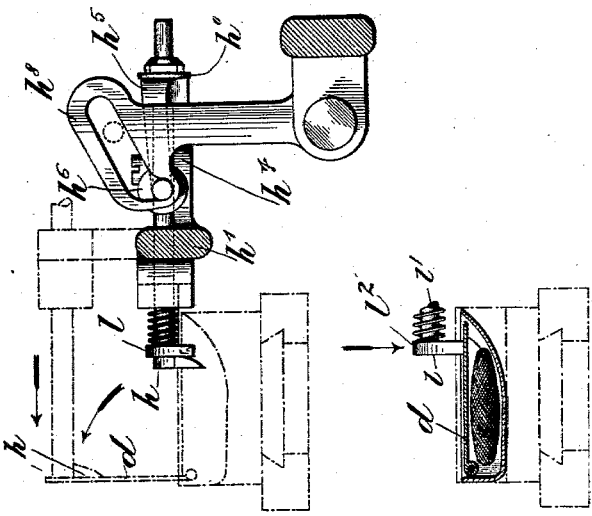
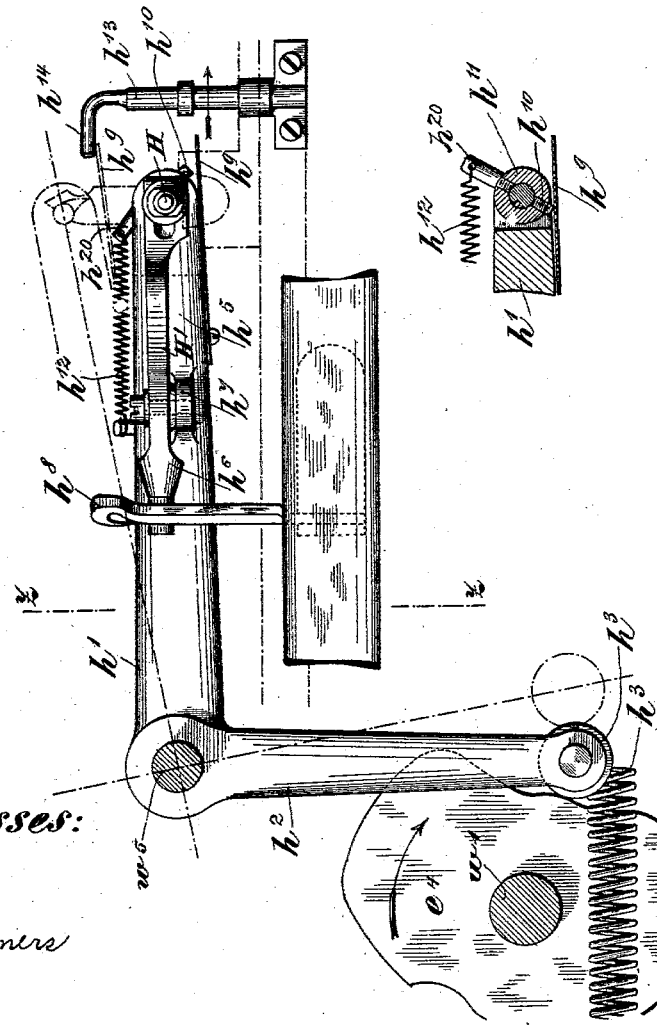
Witnesses:
Inventor:
Johan Jakob Sonderegger
by Henry Orth
Atty.

No. 629,308.  
J. J. SONDEREGGER.  
MACHINE FOR INSERTING BOBBINS IN SHUTTLES.  
(Application filed July 23, 1898.)  
Patented July 18, 1899.
(No Model.)  
9 Sheets—Sheet 6.
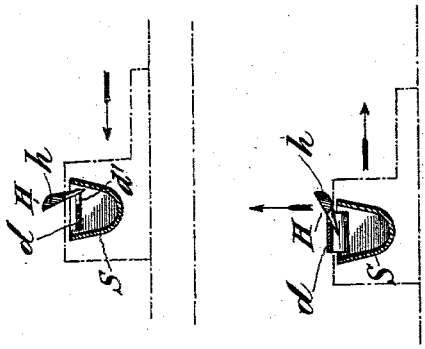
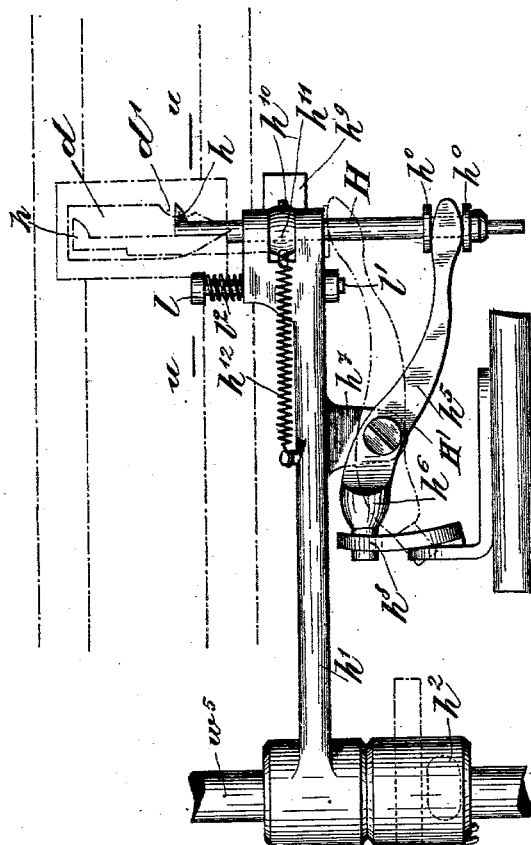
Witnesses:
Inventor:  
Johan Jakob Sonderegger.

No. 629,308. Patented July 18, 1899.
J. J. SONDEREGGER.
MACHINE FOR INSERTING BOBBINS IN SHUTTLES.
(Application filed July 23, 1898.)
(No Model.) 9 Sheets—Sheet 7.
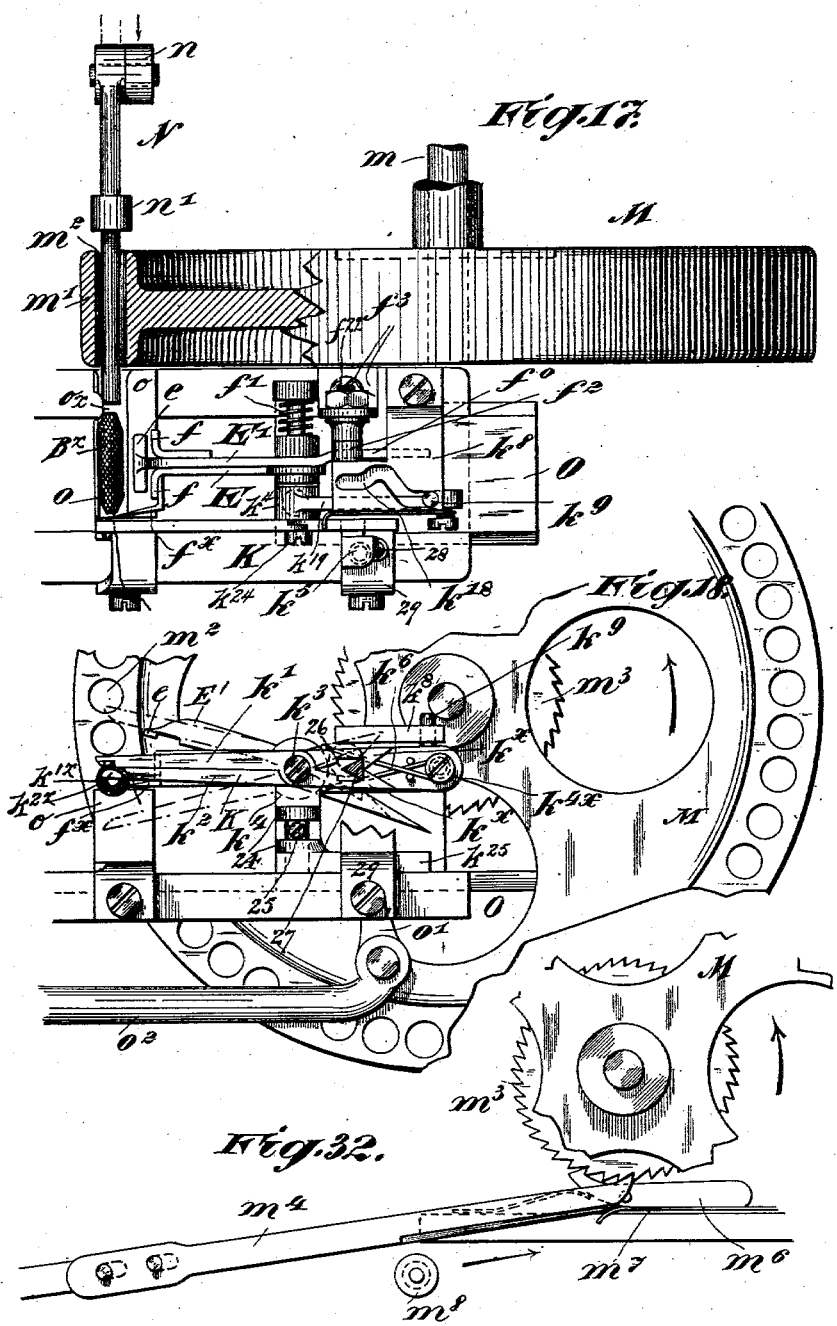
Witnesses:
Inventor:
Johan Jakob Sonderegger
by Henry Orth
Atty.

No. 629,308. Patented July 18, 1899.
J. J. SONDEREGGER.
MACHINE FOR INSERTING BOBBINS IN SHUTTLES.
(Application filed July 23, 1898.)
(No Model.) 9 Sheets—Sheet 8.
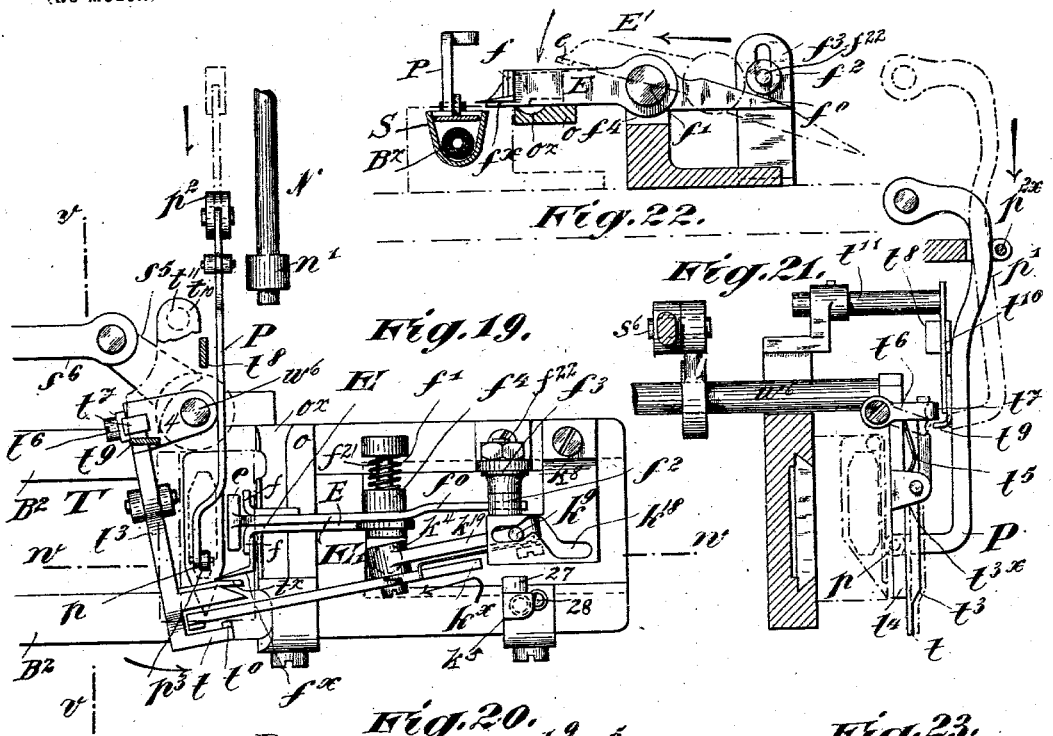
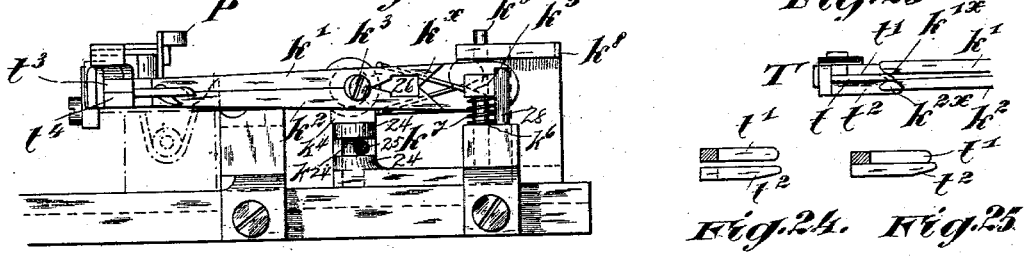
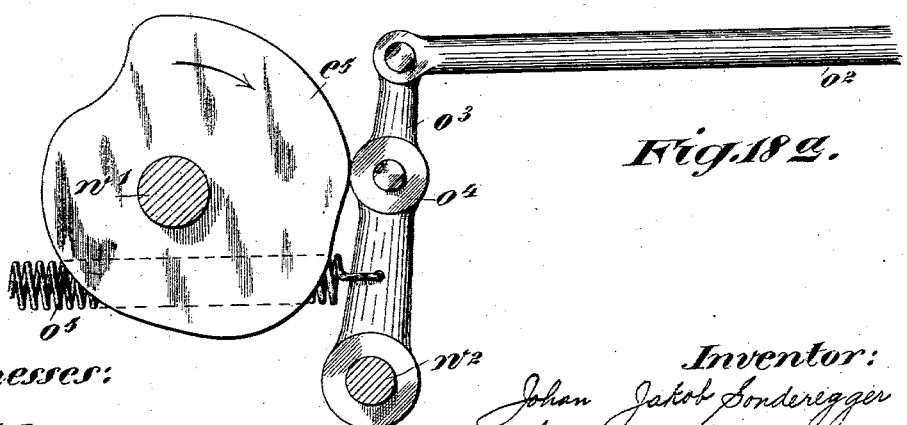
Witnesses:
Inventor:
Johan Jakob Sonderegger
by Henry Orth
Atty.

No. 629,308. Patented July 18, 1899.
J. J. SONDEREGGER.
MACHINE FOR INSERTING BOBBINS IN SHUTTLES.
(Application filed July 23, 1898.)
(No Model.) 9 Sheets—Sheet 9.
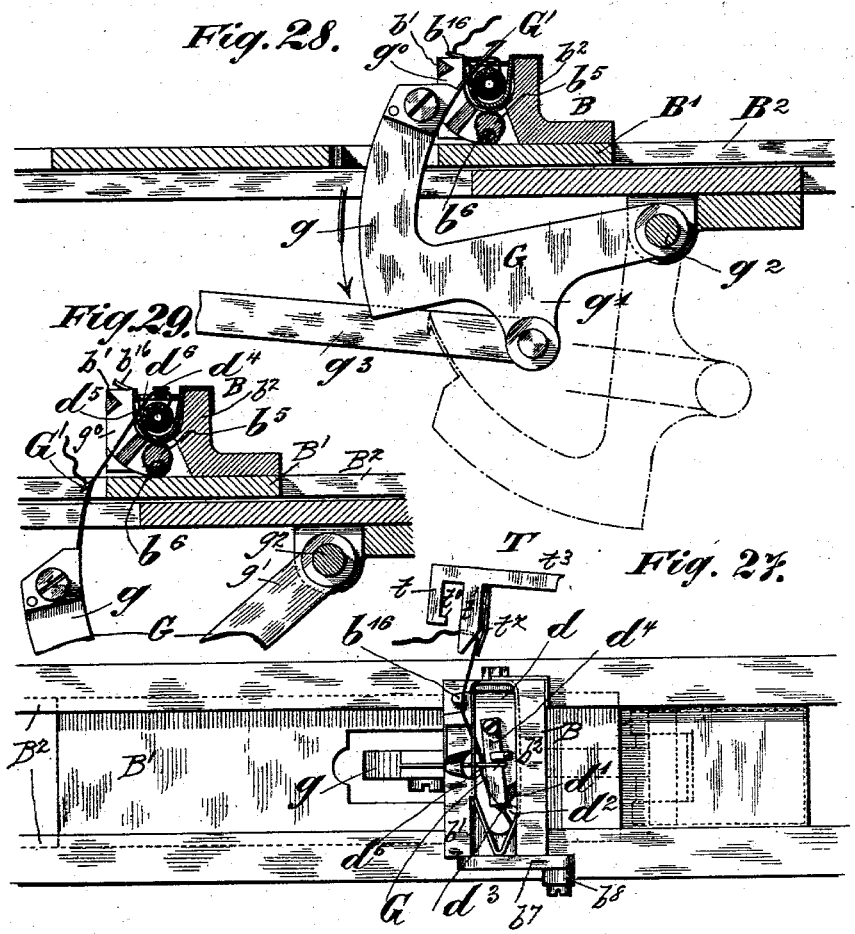
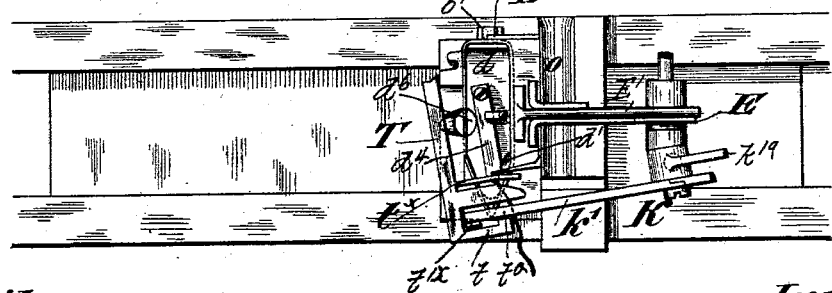

UNITED STATES PATENT OFFICE.

JOHAN JAKOB SONDEREGGER, OF ARBON, SWITZERLAND, ASSIGNOR TO STICKEREI FELDMUEHLE, VORMALS LOEB, SCHOENFELD & CO., OF RORSCHACH, SWITZERLAND.

MACHINE FOR INSERTING BOBBINS IN SHUTTLES.

SPECIFICATION forming part of Letters Patent No. 629,308, dated July 18, 1899.

Application filed July 23, 1898. Serial No. 686,724. (No model.)

*To all whom it may concern:*

Be it known that I, JOHAN JAKOB SONDEREGGER, a citizen of the Swiss Republic, residing at Arbon, near St. Gallen, Switzerland, have invented a new and useful Machine for the Automatic Insertion of Bobbins in the Shuttles of Embroidering-Machines or the Like, (for which I applied for a patent in Germany on the 26th of May, 1898; in Switzerland on the 28th of May, 1898; in Austria on the 10th of June, 1898; in France on the 15th of June, 1898, and in Great Britain on the 18th of June, 1898,) of which the following is a specification.

This invention has relation to a machine for mechanically inserting bobbins into shuttles, and more particularly for inserting bobbins into the shuttles used in embroidering-machines in such manner that said shuttles when they leave the machine are ready for insertion into the shuttle-carrier of embroidery-machines.

The invention consists, broadly speaking, in feeding devices operating to automatically and periodically feed the empty closed shuttles to a suitable holder, and in mechanisms for opening the shuttles, inserting a bobbin, closing said shuttle, drawing the end of the bobbin-thread under the tension-spring on the shuttle-cover, threading said end through the thread-opening in the shuttle-wall, and ejecting said shuttle from its holder, said mechanisms organized to repeat the described operations indefinitely.

The invention further consists in the combination of certain mechanisms for producing given results and in details of construction, as will hereinafter appear.

Figure 2:
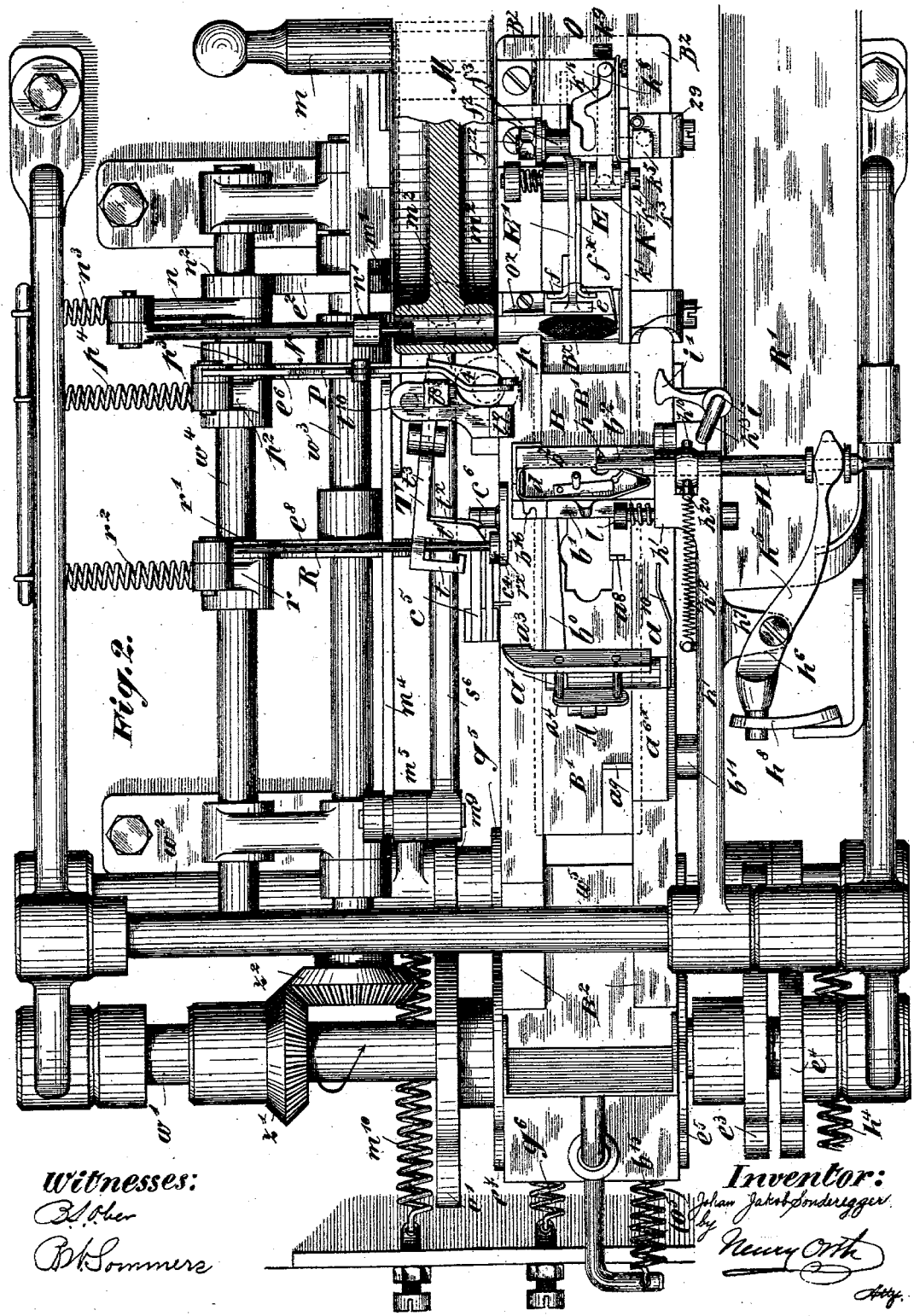

In the accompanying drawings, Figure 1 is a sectional front elevation of a machine embodying my invention, parts being broken away. Fig. 2 is a sectional top plan view of the machine, the shuttle-feed trough being removed and showing the guide-plate for the shuttle-ejector pins. Fig. 3 is a fragmentary sectional front view showing a part of the shuttle-feed trough, the shuttle-ejector, the means for actuating the same, the shuttle-holder, and its carrier-slide. Fig. 4 is a plan view of Fig. 3, the shuttle-feed trough being partly broken away. Fig. 5 is a cross-section on line $y\,y$ of Fig. 3, looking toward the right. Fig. 6 is a fragmentary front elevation showing the shuttle-holder, its carrier, and the spring for closing the holder. Fig. 7 is a top plan view of Fig. 6; Fig. 8, a left-side elevation; Fig. 9, a rear end elevation; and Fig. 10 a longitudinal section of parts shown in Figs. 6 and 7, said longitudinal section taken on line $x\,x$ of said Fig. 7. Fig. 11 is a fragmentary detail front elevation, partly in section, showing the mechanism for shifting the cam $b^5$ on the pintle of the shuttle-holder out of and into its normal position. Fig. 12 is a fragmentary front elevation of the mechanism for raising the shuttle-cover prior to the introduction of a bobbin. Fig. 12$^a$ is a sectional detail of Fig. 12. Fig. 13 is a top plan view of the parts shown in said Fig. 12. Fig. 14 is a left-side elevation of mechanism shown in Fig. 12, the parts shown in dotted lines in said Fig. 14 assumed to be a section on line $z\,z$ of Fig. 12. Fig. 15 is a sectional detail showing the nose of the shuttle-opener about to engage the shuttle-cover, the section being taken on line $u\,u$ of Fig. 13. Fig. 16 is a like view, showing the nose of the shuttle-opener in engagement with the shuttle-cover and about to raise the same. Fig. 17 is a fragmentary sectional plan view of the bobbin-carrier, the bobbin-ejector, and the other mechanism coöperating therewith for the introduction of the bobbin into the open shuttle and for holding the thread end of the bobbin. Fig. 18 is a front elevation of Fig. 17, showing also part of the mechanism for imparting the required to-and-fro movements to the slide which carries the mechanism shown in Fig. 17, the remaining portion of said actuating mechanism being shown in Fig. 18$^a$. Fig. 19 is a fragmentary top plan view illustrating the mechanism for closing the shuttle after the introduction of a bobbin and the mechanism for drawing the bobbin-thread end under the tension-spring on the shuttle-cover, said mechanisms being shown in their operative positions. Fig. 20 is a front elevation, and Fig. 21 a sectional left side elevation, of the parts shown in Fig. 19, the section Fig. 21 being taken on line $v\ v$ of said Fig. 19, and parts are shown in dotted lines. Fig. 22 is a detail sectional front elevation showing the shuttle-closer in its position after closing down the shuttle-cover, the section being taken on line $w\ w$ of Fig. 19 and parts being shown in dotted lines. Fig. 23 is a front end elevation of the thread-holder and part of the bobbin-thread clamp, said thread-holder in the act of taking the thread from the clamp. Figs. 24 and 25 are sectional front views of the thread-holder, showing its nipping-jaws open and closed, respectively. Fig. 26 is a fragmentary plan view showing the thread-holder in the act of drawing the bobbin-thread end into the thread guide-slot in the shuttle-cover near the free end of the tension-spring. Fig. 27 is also a fragmentary plan view showing the position of the thread-holder after having drawn the bobbin-thread under shuttle tension-spring and under a spring-clip on the shuttle-holder, holding the thread taut and ready to be seized by the threading-hook and threaded through the thread-opening in the shuttle-wall. Fig. 28 is a longitudinal sectional view of Fig. 27. Fig. 29 is a similar fragmentary view showing the threading-hook in its position after drawing the bobbin-thread through the thread-opening in the shuttle. Fig. 30 is a fragmentary sectional detail illustrating the auxiliary shuttle-closer preferably used to insure the engagement of the shuttle-cover with its retaining device. Fig. 31 is a fragmentary view, parts being shown in dotted lines, illustrating the means for ejecting the filled shuttle from its holder; and Fig. 32 is a fragmentary elevation showing the means for revolving the bobbin-carrier.

On a suitable frame, from which the operative mechanisms are supported, are secured two guide-rails $B^2$, having a guide-groove in their proximate faces, in which grooves the shuttle-holder slide or carrier $B'$ has motion. To the guide-rails $B^2$ are secured brackets from which the lower end of an upwardly-inclined shuttle-feed trough $A'$ is secured and in which the shuttles S are placed with their longitudinal axes transversely of the trough and with their covers closed down, the width of the trough being such as to allow the shuttles therein to freely slide along the open delivery end.

Inasmuch as one shuttle after another is to be supplied with a bobbin, said shuttles must be fed intermittingly from the trough to the mechanism through which the bobbins are introduced into the shuttles, and to prevent the shuttles from sliding out of the trough the lower end of its cover is slotted and has secured thereto a flat spring $a^2$, whose free end lies in the path of the lowermost shuttle and prevents it from dropping out of the trough, Figs. 1, 3, 4, and 11.

The shuttles S are successively and intermittingly ejected from the trough by means of ejecting appliances A, consisting of a spindle $a^6$, journaled in bearings secured to the guide-rails $B^2$, said spindle being provided with two radial arms $a^5$ and $a^7$. To the radial arm $a^5$ is hinged a plate $a^4$, from which project two ejector pins or fingers $a'$, guided in a suitably-apertured plate $a^3$, secured to the bottom of the shuttle-feed trough $A'$ at its delivery end. The plane of motion of the ejector-fingers relatively to the shuttle at the delivery end of the trough is such that said fingers when moved into the trough through suitable openings in its bottom will impinge upon the shuttle, on the left side thereof, sufficiently close to its vertical axis to eject said shuttle from the trough, said shuttles having a more or less conical form in cross-section. The second radial arm $a^7$ projects into the path of two abutments $a^8$ and $a^9$ in the form of angle-plates, secured to the slide $B'$ at suitable distances apart, Figs. 2, 3, and 4, so that when said slide reaches the limit of its movement from right to left, at which time the holder for the shuttles will be below the delivery end of the feed-trough $A'$, the said radial arm $a^7$ comes in contact with abutments $a^8$, thereby rocking the spindle $a^6$ to move the ejector-fingers $a'$ into said trough, thereby ejecting the lowermost shuttle S, which drops into the shuttle-holder B cover upward. When, on the contrary, the slide $B'$ moves from left to right to carry the shuttle-holder, with its shuttle, to the mechanism for introducing a bobbin, the radial arm $a^7$ comes in contact with the abutment $a^9$, thereby rocking the spindle $a^6$ in a reverse direction and retracting the ejector-fingers $a'$ from the trough $A'$, allowing the next succeeding shuttle to slide down to the delivery end of said trough, where it will be held by the spring $a^2$ until ejected.

The abutment $a^9$ may be dispensed with and the ejector allowed to move out of the trough by gravity. I prefer, however, to move it positively in order to insure its being retracted from the trough $A'$.

In practice I prefer to secure to the front bearing for the ejector-spindle $a^6$ a flat guard-spring or more or less resilient plate $a^{10}$, projecting from said bearing toward the right thereof a sufficient distance to close the front end of the open shuttle-holder B when it lies under the delivery end of the feed-trough $A'$ to prevent the shuttle dropping into said holder from accidentally sliding too far toward the front or partly out of the front end of the holder, said guard spring or plate being shown in Fig. 2.

The slide $B'$ receives its various movements to and fro from a suitably-constructed cam $e^3$ on a cam shaft $w'$, Figs. 2 and 3, acting upon a roller on a stud or pin $b^{10}$, projecting from a lever $b^{13}$ loose on a cross-shaft $w^2$. The upper end of the lever $b^{13}$ is pivoted to one end of a connecting-rod $b^{12}$, whose opposite end is pivoted to a stud or pin $b^{11}$ of a lug on the block on the under side of slide $B'$, the roller on lever $b^{13}$ being held in contact with the cam $e^3$ by a spring $b^{15}$, secured to the aforesaid block on the slide B' and to a frame part. (See also Fig. 1.)

The shuttle-holder B is carried by the slide B' at or near its right-hand end, and referring more particularly to Figs. 1 to 4 and 6 to 10, and, as shown, said holder consists of two parts, one, $b^2$, secured to the slide B' and provided with perforated lugs or ears $b^{3\times}$, in which is loosely mounted a hinge-pintle $b^6$, the other part, $b'$, being likewise provided with perforated lugs or ears $b^3$, through which the hinge-pintle $b^6$ passes loosely. The two parts of the shuttle-holder are so constructed as to form between them a seat suitable to the accommodation of the shuttles and to properly hold the same. The pintle $b^6$ has secured to its rear end, outside of the holder B, a radial arm $b^4$, and about midway of its ends, within the holder, a cam $b^5$. The radial arm $b^4$ in its normal position projects vertically above the pintle $b^6$, and the angular relation between arm $b^4$ and cam $b^5$ is such that when said arm $b^4$ is partly revolved the greater diameter of cam $b^5$ will lie in a vertical plane above the axis of the pintle $b^6$. To the front end of pintle $b^6$ is pivoted a two-armed lever $b^7$, whose shorter left arm is pivoted to the hinged part $b'$ of the holder B, while its longer right arm has a laterally-projecting pin carrying a roller $b^8$ in the path of the upper edge of a plate $b^9$, secured to the front face of the forward one of the two guide-rails $B^2$, in which the slide B' has motion, which upper edge of plate $b^9$ is curvilinear and inclines toward the right. A flat spring $b^0$ is secured to the slide B', (see Figs. 1 and 2,) whose free end bears against the under side of the hinged part $b'$ of the holder B and holds said part $b'$ in its closed position. When, however, the slide moves toward the left and the roller $b^8$ rides up the inclined track on plate $b^9$, the lever $b^7$ is tilted and moves the said part $b'$ away from part $b^2$ against the stress of spring $b^0$, or, in other words, opens the shuttle-holder B for the reception of a shuttle. The relative arrangement of the parts is such that the shuttle-holder will be fully open when the slide B' has reached the limit of its motion to the left, at which time the said holder will be below the delivery end of the shuttle feed-trough A' and the ejector A will be actuated to eject a shuttle from the trough, as above described. Of course when the slide B' moves toward the right and the roller $b^8$ rides down the incline of plate $b^9$ the lever $b^7$ is released, leaving the spring $b^0$ free to again close the shuttle-holder B.

On the rear face of the fixed part $b^2$ of the shuttle-holder B is secured a finger $b^{21}$, that projects toward the hinged part $b'$ to hold the shuttle against rearward displacement, and said part $b'$ has an opening $g^0$, and on the upper face at its rear end a thread guide-lip $b^{16}$ for purposes presently to be described.

When a shuttle has been fed to the holder B and the latter has moved away from the feed-trough A' a sufficient distance to effect the release of lever $b^7$, as above described, and permit the spring $b^0$ to close the hinged part $b'$ of said holder upon the shuttle, the latter will be firmly gripped and held against lateral as well as endwise movement. It is, however, also necessary to the subsequent operations of the mechanisms whereby a bobbin is introduced into the shuttle that the latter be firmly seated in the holder and held against vertical displacement. The shuttle is held against vertical displacement by the gripping action thereon of the hinged part $b'$ of the holder B, and it is firmly seated therein by the cam $b^5$, moved under it, when said holder moves toward the right and when the roller $b^8$ on lever $b^7$ is about to reach the right-hand end of its track on plate $b^9$—that is to say, when said lever is about to be released to enable the spring $b^0$ to close the part $b'$ of the holder upon the shuttle therein. To this end I provide a two-armed lever $c^4$, fulcrumed upon the arm of a bracket secured to the rear one of the two guide-rails B', the fulcrum-pin $c'$ of the lever projecting rearwardly and having secured thereto a sleeve, or provided with a boss $c^6$, Fig. 31, having two flat faces against which bears the free end of a spring $c^5$, also secured to the aforesaid bracket. (See Fig. 2.) The left-hand arm of the lever $c^4$ has a downwardly-projecting arcuate extension $c^2$, while the right-hand arm $c^3$ is bent downwardly and has a convex under face, one of said arms projecting at all times into the path of the aforementioned cam $b^4$ on the pintle $b^6$ of the shuttle-holder B. The normal position of the lever $c^4$ is shown in dotted lines in Fig. 11, its arcuate extension $c^2$ raised out of the path of the radial arm $b^4$ and its arm $c^3$ in the path of said radial arm. As the slide B' and shuttle-holder B move toward the right and when the roller $b^8$ on lever $b^7$ has nearly reached the right end of its track on plate $b^9$ the arm $b^4$ impinges upon the right arm $c^3$ of lever $c^4$, and as the latter is yieldingly held against rotation by its spring $c^5$ both the arm $b^4$ and lever will be rotated, and thereby the pintle $b^6$, sufficiently to turn the cam $b^5$ so that its greater half-diameter will lie above said pintle, said cam then supporting the shuttle S, Fig. 10, while the lever $c^4$ is tilted into the position shown in full lines in Fig. 11 and held in that position by the spring $c^5$, the downward motion of the arcuate extension $c^2$ of said lever being limited by the shuttle-ejector rod R, hereinafter to be referred to. When the slide B' again moves toward the left, the radial arm $b^4$ impinges upon the inner face of extension $c^2$ of lever $c^4$, whereby said lever, the radial arm $b^4$, and cam $b^5$ are returned to their described normal positions, the lever $c^4$ being held in said position by the spring $c^5$.

The cover $d$ of the shuttle S, Fig. 30, is hinged to a pintle at the rear end of the shuttle and at its forward free end catches, as usual, in a kerf or notch in the shuttle or is locked to the latter in any well-known manner and has in its right-hand edge, near the shuttle-nose, a recess $d'$ and forward of the same an oblique thread-slot extending from said edge rearwardly toward the left-hand edge close to the free end of a tension-spring $d^4$, secured to said cover, the left-hand edge of the latter being notched or recessed at $d^6$, while in the left-hand wall of the shuttle is formed a thread eye or slot $d^5$, in line with notch $d^6$ and substantially at right angles to the longitudinal axis of said shuttle, for the passage of the bobbin-thread. (See Figs. 26 to 29, inclusive.) The construction of the shuttle is, however, more clearly shown and more fully described in my application for patent, Serial No. 686,723, filed July 23, 1898, the object of this construction being made apparent hereinafter.

As heretofore stated, the shuttles S are fed to the holder B with their covers closed down, so that before a bobbin can be introduced it is necessary that the shuttle-cover $d$ be opened. This is effected through the medium of the following instrumentalities, reference being more particularly had to Figs. 2 and 12 to 16, inclusive: On the cam-shaft $w$, heretofore referred to, is secured an irregularly-faced cam $e^4$, adapted to impart the proper movements to a radial arm $h^2$, secured to a rock-shaft $w^5$, said radial arm carrying a roller $h^3$, held in contact with said cam by a spring $h^4$, connected with the radial arm and with the framing of the machine. On shaft $w^5$ is secured a lever $h'$, whose outer end is enlarged and forked, the branches of the fork being provided with bearings for the cover-opening rod H, that carries a sleeve $h^{11}$ between said branches of the fork. At its inner end the rod H has a radial arm or nose $h$ and the sleeve $h^{11}$ has two radial pins $h^{10}$ $h^{20}$ diametrically opposite each other, the pin $h^{20}$ being connected with lever $h'$ by a spring $h^{12}$, that holds the opener-rod H with its nose $h$ turned downwardly at an angle, Figs. 13 and 15, said nose $h$ being wedge-shaped. From the front face of lever $h'$ projects a lug or ear $h^7$, to which is secured a vertical pivot-pin, on which is pivoted a two-armed lever H', whose longer right-hand arm $h^5$ is forked at its outer end and straddles the rod H between two collars $h^0$ thereon. The shorter left-hand arm $h^6$ of the lever H' terminates in a stud that projects into an inclined slot having at its lower end a depression or recess, Fig. 14, said slot being formed in the vertical arm of a bracket $h^8$, secured to a frame member. The rod H occupies a position on the right of the shuttle feed-trough A' and between the shuttle-ejector rod R and the appliances for introducing a bobbin into the shuttle.

The cam-shaft $w'$ revolves continuously during the operation of the machine, and the cams $e^3$ and $e^4$ are of such configuration that when the slide B' is moving toward the right and the shuttle-holder B has reached a point under the rod H to enable the nose $h$ thereof to enter the notch or recess $d'$ in the shuttle-cover the further movement of the slide is interrupted, while the lever $h'$ is moved downwardly, thereby inserting the nose $h$ of rod H into recess or notch $d'$ in the shuttle-cover $d$, the said nose impinging upon the right-hand wall of the shuttle. Immediately thereafter the slide B' is moved toward the left, but only a sufficient distance to cause the wall of the shuttle to act upon the nose $h$ of the opener-rod H and turn the same against the stress of spring $h^{12}$, so as to move said nose under the shuttle-cover $d$, Fig. 16. The slide B' again remains stationary, while the lever $h'$ begins its upward swing, thereby lifting the shuttle-cover. At the same time the slot in the bracket-arm $h'$ causes the arm $h^5$ of lever H' to swing inwardly, thereby moving the rod H in the same direction while said rod is being lifted by the lever $h'$ until the latter has reached the limit of its upward swing, as shown in dotted lines in Fig. 12, when the arm $h^5$ of lever H' and the shuttle-opener H will also have reached the limit of their inward movement, as shown in dotted lines in Fig. 13, the shuttle-cover $d$ being thereby completely thrown up or into a vertical position. The slide B' now continues its motion to the right, while the levers $h'$ and H' and the shuttle-opener H move back to their normal positions, ready for the next operation, which takes place after the insertion of a bobbin into the shuttle, the closure of the shuttle-cover and the threading of the bobbin-thread through the thread-eye of said shuttle, the ejection of the latter from its holder, and the return of the shuttle-holder from the feed-trough A' with an empty shuttle. To the under side of the lever $h'$ is secured a flat spring $h^9$, and when the rod H is turned, as above described, from the position Fig. 15, into its operative position, Fig. 16, against the stress of its spring $h^{12}$ the radial pin $h^{10}$ comes in contact with the spring $h^9$, and as said pin moves over its dead-center toward the left the spring $h^9$, acting thereon, assists in turning the rod H into its said operative position and locks said rod against the action of the spring $h^{12}$. In order that the last-named spring may turn the rod H back to its normal position, I provide an abutment in the form of a vertical arm $h^{13}$, whose upper end $h^{14}$ is bent at right angles and lies in the path of the free end of the spring $h^9$, which projects beyond the sleeve $h^{11}$, so that when the lever $h'$ and rod H are about to reach the limit of their upward movement the spring $h^9$ will come in contact with the bent part $h^{14}$ of arm $h^{13}$ and will be drawn out of contact with the radial pin $h^{10}$, thereby permitting spring $h^{12}$ to turn the rod H back into its normal position. The cover $d$ of the shuttle having been opened, as described, the slide B' continues its motion toward the right.

In suitable bearings on the main frame is secured a shaft $m$, on which is loosely mounted the bobbin-carrier, consisting of a disk or wheel M, in the rim of which, close to its periphery and parallel with its axis of rotation, are formed a series of closely-arranged but equidistant holes $m^2$ for the reception of bobbins $B^\times$.

Referring more particularly to Figs. 1, 2, 18, 19, and 32, there is in front of the bobbin-carrier a plate or receiving-table $o$, that projects across the track-rails $B^2$, and said bobbin-carrier receives a periodical step-by-step or progressive rotation from right to left, as shown by the arrow, Fig. 18, through the following mechanism.

To the hub of the carrier M, on its rear side, is secured a ratchet-wheel $m^3$, having a number of teeth equal to the number of bobbin-seats $m^2$ in the carrier, a pawl at the end of a long pawl-arm $m^4$ being held in engagement with said teeth by a spring $m^7$, Fig. 32, there being a second pawl $m^6$ held in engagement with the ratchet-teeth by a spring (shown in dotted lines in Fig. 32) to prevent backward rotation. The pawl-lever $m^4$ is pivoted to a lever $m^5$, having rocking motion on a shaft $w^2$, hereinbefore referred to, and being rocked by a cam $e'$ on cam-shaft $w'$, said lever having a laterally-projecting pin carrying a roller $m^9$, held in contact with said cam $e'$ by a spring $m^{10}$, connected with the lever and with the machine-frame, Figs. 1 and 2. The construction of the cam or eccentric $e'$ is such as to impart to the rock-lever $m^5$ a periodical rocking motion to revolve the bobbin-carrier M, through the pawl-lever $m$, a distance equal to that between two teeth on ratchet-wheel $m^3$ and equal to that between two bobbin-seats $m^2$ in carrier M, this periodical movement taking place when the slide B' is moving toward the right.

As shown in Fig. 32, I provide below the pawl-arm $m^4$ a roller $m^8$ on a pin secured to the main frame to prevent said arm $m^4$ from dropping down should it accidentally move out of contact with the spring $m^7$.

The bobbins are successively ejected from their seats in carrier M by an ejector-rod N onto the receiving-table $o$, said ejector being guided in a sleeve $n'$, supported from the machine-frame, the rear end of the ejector N being pivoted to the upper end of a lever $n$, loose on a shaft $w^4$, arranged longitudinally of the machine, said lever $n$ having a laterally-projecting pin carrying a roller $n^2$, held in contact with the periphery of a cam $e^2$ by a spring $n^3$, connected with the lever and the machine-frame, said eccentric being secured to a shaft $w^3$, parallel with shaft $w^4$ above the same, Fig. 2.

When the slide B' has reached the limit of its motion to the right, with the shuttle-holder B close to the left edge of the receiving-table $o$ and the shuttle-cover wide open, the bobbin $B^\times$ previously ejected from carrier M and lying on table $o$ is transferred from the latter to the shuttle.

The bobbins $B^\times$ are inserted into their seats in the carrier M with the loose thread end forwardly, so that when a bobbin is transferred to a shuttle the thread end will be at the forward end or nose of said shuttle, and so that when ejected said thread will lie between the jaws of a thread-clamp before the bobbin is transferred to the shuttle and the thread drawn under the shuttle tension-spring and through the thread slot or eye $d^5$ in the right-hand wall of the shuttle, hereinbefore alluded to.

The appliances for transferring a bobbin from table $o$ to the shuttle and for holding fast the thread end thereof, for purposes to be described, are organized as follows, reference being more particularly had to Figs. 1 and 2 and 17 to 20.

A slide O has motion in the guide-rails $B^2$ on the right of the receiving-table $o$, and from the under side of said slide projects a lug or arm $o'$, to which is pivoted one end of a connecting-rod $o^2$, Fig. 18, whose opposite end is pivoted to a rock-lever $o^3$ on shaft $w^2$, said lever carrying a roller $o^4$ in contact with a suitable cam $e^5$ on cam-shaft $w'$, said roller being held in contact with said cam by a spring $o^5$, secured to the lever and to a frame part, Figs. 2 and $18^a$, whereby the required to-and-fro movements are imparted to the slide O. A presser-lever E' is loosely mounted on a stud or pin $f'$, projecting forwardly from the vertical arm $f^4$ of a bracket on the slide O, and a spring $f^{21}$, secured to said stud or its support and to the hub or bearing of the lever, tends to draw its left or pressure arm downwardly, while its right tapered arm is held against such motion by a roller $f^2$, when the lever is in a given position relatively to said roller, which latter is journaled on a stud $f^{22}$, adjustable vertically in a slot formed in the vertical arm of a bracket $f^3$, rising from the rear one of the two guide-rails $B^2$ for the slides B' and O. The presser-lever E' is held in its normal position with is presser-arm elevated, Fig. 1, when the slide O is in its normal position or at the limit of its motion toward the right. As the slide O moves to the left the tapered right arm of lever E' slides along the roller $f^2$, causing the left or presser arm of said lever to move down under the action of its spring $f^{21}$, and as the slide O is about to reach the limit of its movement to the left the said presser-arm will lie upon the bobbin $B^\times$ on the receiving-table $o$ and hold the same firmly, the thread end of the bobbin being then held by thread-clamp K.

On the aforesaid stud $f'$ is loosely mounted a push-bar E, the forward end of which is T-shaped, forming a cross-head, and between the diverging arms $f$ of said head is a groove or channel for the reception of the presser-lever E', the length of the left or presser arm of said lever relatively to that of the push-bar being such that when lever E' is depressed, as above described, to hold a bobbin the cross-head of the push-bar E will lie immediately behind such bobbin, ready to push the same over the receiving-table o into the open shuttle in the shuttle-holder.

In order that the bobbin may be more firmly held by the presser-lever E', the table o is preferably provided with a channel $o^\times$ in line with the bobbin-seats $m^2$ in carrier M, as shown in Figs. 17 and 19, the end of said channel proximate to said carrier being made flaring outwardly.

To the forward arm $f$ of the cross-head of the push-bar E is secured a guide-finger $f^\times$ for purposes presently to be explained.

It will readily be seen that by means of the devices E and E' the bobbin is thrust or rolled into the shuttle with certainty and in a proper manner—that is to say, with the longitudinal axis of the bobbin in the plane of the longitudinal axis of the shuttle, and this is made more certain because the height of the shuttle-holder is such that its upper face is flush with the upper face of the receiving-table o, or substantially so, and because at the moment when the bobbin is moved over the table into the shuttle its holder is in contact with said table.

The thread-clamp K, Figs. 2, 17, 18, 19, 20, and 23, between the jaws of which the bobbin-thread end passes when a bobbin is ejected onto table o, is composed of two jaws $k' k^2$, pivoted together shear-like, and from the outer or nip end of the clamping-jaws project lips $k'^\times$ and $k^{2\times}$, respectively, whose proximate faces are convex, as more clearly shown in Fig. 23. The pivot-pin of the thread-clamp K, which may have its inner end screw-threaded, is screwed or otherwise secured to a swivel-head $k^4$, the swivel-pin of which has its bearing in the vertical arm of a bracket $k^{25}$, on which vertical arm are formed two shoulders or abutments 24, and to said swivel-pin between said shoulders is secured a radial screw-pin or screw 25, that serves to limit the rotation of the swivel-head in either direction, as more clearly shown in Fig. 20. The proximate faces or edges of the clamp-jaws $k' k^2$ are beveled at their rear or left end, so as to diverge rearwardly and form an acute-angled recess $k^\times$ between them when the jaws are closed, and immediately in rear of their pivot-pin a similar but smaller recess is formed, merging into a polygonal opening 26, formed by recessed portions in the proximate faces or edges of the jaws.

To the swivel-head $k^4$ is secured an arm $k^{19}$, that projects toward the left and carries at its end a pin or stud $k^9$, which projects into a longitudinal slot $k^{18}$, formed in an angle-plate $k^8$, secured to a vertical bracket-arm on the rear one of the two guide-rails $B^2$, said plate $k^8$ projecting over the slide O, as shown in Figs. 2, 17, and 19. The right-hand portion of the slot $k^{18}$ lies in a plane in rear of the left-hand portion of said slot for purposes hereinafter to be described, the two parts of said slot being connected by a diagonal portion.

To the front face of the forward one of the guide-rails $B^2$ is secured a bracket 29, in the upper end of which is swiveled a clamp-opener $k^5$, having a prismatic block 27 in the path of the left end of the clamp-jaws $k' k^2$, a spring $k^7$ on the swivel-pin of the opener and secured thereto and to its bracket, respectively, tending to hold the block 27 in the path of said clamp-jaws, its rotation from left to right under the stress of its spring being limited by a pin 28, projecting from the bracket 29. (See Figs. 17, 19, and 20.)

In its normal position the axis of the pin $k^{24}$ of the swivel-head $k^4$, to which the clamp K is pivoted, intersects the axis of the pin $f^{21}$, on which the presser-lever E' and push-bar E are mounted. The clamp-jaws $k' k^2$ are held normally closed by springs $k^6$, and the left or clamping portion of said jaws projects some distance beyond the presser-lever E' and push-bar E, so that the nip end of said jaws may lie in the path of the bobbin-thread end as the bobbin is being ejected from the carrier M. In Fig. 17 these parts are shown in their relative positions ready for operation, the presser-lever E' in its elevated position, Figs. 1 and 18, the cross-head $ff$ on the push-bar E on receiving-table o on the left of the channel $o^\times$, containing the bobbin $B^\times$, the jaws $k'$ and $k^2$ of the thread-clamp K closed upon the loose end of the bobbin-thread, the prismatic clamp-opener 27 in the recess 26 between the left arms of said clamp-jaws, and the pin $k^9$ on arm $k^{19}$ of swivel-head $k^4$ in the rear end of slot $k^{18}$ of plate $k^8$, the slide O moving toward the left. As hereinbefore explained, during this movement of the slide O the presser-lever E' is depressed upon the bobbin $B^\times$, which latter is then pushed toward the left out of its channel $o^\times$ in the receiving-plate o and into the open shuttle. At the same time the pin $k^9$ passes from the left portion of the longitudinal slot $k^{18}$ into the right portion thereof, and owing to the displacement of said slot portions the clamp K is swung outwardly into the position shown in Fig. 19, drawing the bobbin-thread along. At the same time the cover $d$ of the shuttle is closed down, and the mechanism whereby the shuttle-thread is drawn under the tension-spring $d^4$ on the cover $d$ of the shuttle and then through the thread-eye in the shuttle-wall set in operation, after which the slides B' and O recede from each other, during which movements the shuttle is ejected from its holder and the clamp K opened ready to take hold of the thread end of the next bobbin ejected from the carrier M. After the transfer of the bobbin into the shuttle the slide O moves back to the right, the pin $k^9$ on arm $k^{19}$ moving from right portion of slot $k^{18}$ into the left portion thereof, thereby swinging the clamp K back into its normal position. Immediately thereafter the clamp-opener 27 acts upon the inclined faces at the rear end of the clamp-jaws $k' k^2$, which form the recess $k^\times$, thereby opening the clamp, which now lies in position to receive the thread end of a bobbin, which at this moment is ejected from the carrier M, the slide O still moving to the left, whereby the clamp-opener passes into recess 26 between the clamp-jaws, the clamp closing upon the bobbin-thread under the action of the springs $k^6$. During the described movement of slide O' the roller $f^2$, acting upon the tapering tail of presser-lever E', lifts its presser-arm, as above described, while the push-bar E again lies on receiving-table $o$ on the right of groove or channel $o^\times$—i. e., the parts have been returned into their normal position, Figs. 17 and 18. As the slide O again moves to the left the swivel-head $k^5$ is turned from right to left against the stress of its spring $k^7$ out of the recess 26 about the time the clamp K commences to swing outwardly, as above described.

The cover $d$ of the shuttle is closed down through the medium of the following instrumentalities. A bar P, which carries at its forward end a roller $p$, has to-and-fro motion crosswise of the machine in the line of the shuttle when the latter lies in contact with the receiving-table $o$, the said bar having its opposite ends suitably bent to perform its work, Fig. 21. Near its rear end the bar P is guided in the fork of an arm $p'$, in which is journaled a roller $p^{2\times}$, whereby the forward end of said bar is depressed as its upwardly-bent rear portion $p^{21}$ moves under said roller, thereby closing down the shuttle-cover, the curvature of the bent portion $p^{21}$ being such that as the bar P moves forward its downwardly-bent roller end is gradually depressed to close the shuttle-cover. The downwardly-bent rear end of the push-bar P is pivoted to a lever $p^2$ on the longitudinal shaft $w^4$ hereinbefore referred to, said lever carrying a roller $p^3$, held in contact with a cam $e^6$ on the longitudinal cam-shaft $w^3$ by a spring $p^4$, Fig. 2, secured to the lever and a frame portion, respectively. As the bobbin is pushed by the presser-lever E' and the push-bar E into the shuttle the shuttle-closer bar P moves forward, its roller $p$ impinging upon the shuttle-cover $d$, and as the downwardly-bent forward end of the bar is gradually depressed the said shuttle-cover is gradually closed, the closer-bar receding to its normal position, Fig. 2, under the action of its cam $e^6$ immediately after the closure of the shuttle. These forward and receding movements of the shuttle-closer bar P take place almost simultaneously with the corresponding movements of the thread-holder T, whereby the end of the bobbin-thread is taken from the thread-clamp K, drawn into the oblique slot $d^2$ in the shuttle-cover, Fig. 27, then under the tension-spring $d^4$ on said shuttle-cover, and, finally, under the thread-guide $b^{16}$ on the upper face of the hinged part $b'$ of the shuttle-holder B near its rear end to be held more or less taut and ready, so as to be caught by the threading-hook G', which threads the said thread through the eye $d^5$ in the side wall of the shuttle.

In order to absolutely prevent endwise displacement of the shuttle in its holder while the shuttle-closer bar P is closing the shuttle-cover $d$, I arrange a guard $i'$, Fig. 2, at the right of the bobbin-receiving table $o$ in such position that said guard will close the front end of the shuttle-holder B while its cover is being closed. This guard or guard-arm $i'$ may be conveniently secured upon the vertical abutment-arm $h^{13}$, Fig. 12, hereinbefore referred to.

A vertical spindle $w^6$ is stepped to oscillate in a step $s$ on the base of the machine-frame. This step has the form of a sleeve whose upper face $s'$ is cam-shaped, the spindle $w^6$ carrying a sleeve $s^2$, whose lower face has a corresponding cam-face $s^3$, Fig. 1. These cam-faces $s'$ $s^3$ are of such configuration that when the spindle $w^6$ oscillates in one direction—i. e., from right to left—the said spindle is raised and returns to its normal position, Fig. 1, when oscillated in an opposite direction. The spindle $w^6$ has secured thereto a radial arm $s^5$, to which is pivoted one end of a connecting-rod $s^6$, whose opposite end is pivoted on the pivot-pin of lever $m^5$, to which is also pivoted, as hereinbefore described, the pawl-arm $m^4$, that imparts the step-by-step rotation to the bobbin-carrier M, (see Figs. 1 and 2,) said lever $m^5$ being, as stated, actuated by the cam $e'$.

To the radial arm 4 on the upper end of the spindle $w^6$ is secured the lower clamp-arm $t^4$ of the thread-holder T, which latter consists of said lower and of an upper clamp-arm $t^3$, the outer ends $t'$ $t^2$ of which are bent at right angles and constitute the nipping-jaws of the clamp. The outer end of the upper clamp-arm $t^3$ is prolonged, bent downwardly, and has a second arm or projection $t$ at right angles to said prolongation and lying in the plane of the nip of the nipping-jaws $t'$ $t^2$ of the thread-holder T, as shown in Fig. 23. The aforementioned arm $t$ has a clamp-opener in the form of a double-wedge or lozenge-shaped projection $t^0$, Fig. 19, facing the nip of the jaws $t'$ $t^2$ of holder T, and close to the inner face of the jaw $t'$ is secured an arm $t^\times$, acting as a thread-guide. The lower arm $t^4$ of holder T, as above stated, is secured to a radial arm 4 on the upper end of the spindle $w^6$, and said arm has perforated lugs or ears $t^{3\times}$ secured thereto, in which is pivoted the upper arm $t^3$, the tail of which in rear of its pivot is bent upwardly, so that said tail lies in a higher plane than the remainder of the arm, this to accommodate between said tail and the tail of arm $t^6$ a spring $t^5$, which acts to hold the nipping-jaws closed, Fig. 21. On one side, at the rear end of the lower arm $t^4$, is pivoted a latch $t^7$, whose bent upper portion overhangs the notched tail of arm $t^3$ of holder T and has on its under face a convex boss fitting one or the other of two concave recesses in said tail of the arm $t^3$, Fig. 21.

On the vertical arm of a bracket, which may conveniently be secured to the rear one of the two guide-rails B², Fig. 21, is secured an abutment-plate $t^{10}$ above the thread-holder T, said plate having two downwardly-projecting abutments $t^8$ and $t^9$, respectively, so arranged as that when the holder T swings in either direction the latch $t^7$ contacts with one or the other of said abutments and is thereby shifted from one into the other of the two recesses in the tail of arm $t^3$ of said holder.

After the bobbin has been pushed into the shuttle in its holder B, the thread-clamp K having been swung out to the position shown in Fig. 19, holding the thread end while the shuttle-cover is being closed down or has been closed down, the spindle $w^6$ is oscillated and at the same time raised to bring the thread-holder T into the plane of the nip of the thread-clamp K, and said holder is swung forward, the nipping-jaws $t'$ $t^2$ of said holder T being open, the latch $t^7$ having been shifted into the rear recess in the tail of jaw $t^3$. As the thread-holder T swings into operative position the thread held by clamp K passes between the nipping-jaws of said holder at the same time the clamp-opener $t^0$ on projection $t$ of the arm $t^3$ passes between the projections $k'^\times$ and $k^{2\times}$ on the jaws of the thread-clamp K, thereby spreading said jaws apart, said jaws closing again as soon as the opener has cleared said projections. As the jaws of the thread-clamp K are opened the latch $t^7$ comes in contact with the forward abutment $t^9$ on abutment-plate $t^{10}$, thereby shifting said latch from the rear notch or recess to the forward one in the upper arm $t^3$ of holder T, thereby closing its nipping-jaws upon the bobbin-thread under the action of the spring $t^5$. At the same time the thread-guide $t^\times$ is in contact with the like guide $f^\times$ on the push-bar E, thus insuring the proper guiding of the thread end into the thread-slot $d^2$ in the cover $d$ of the shuttle, Fig. 26. The guide-arm $f^\times$ prevents the thread from slipping back into the recess $d'$ in the shuttle-cover, while the guide-arm $t^\times$ prevents the thread from slipping from between the nipping-jaws $t'$ $t^2$ of the thread-holder T, as more clearly shown in Fig. 26. The shaft $w^6$ is now oscillated in an opposite direction—i. e., from left to right—and lowered so that the bobbin-thread will be in the plane of the tension-spring $d^4$ on the shuttle-cover $d$ and in the plane of the thread-guide $b^{16}$ on the upper face and at the rear end of the hinged part $b'$ of the shuttle-holder B, the thread-holder T swinging back. In this movement its clamp-opener $t^0$ again passes between the projections $k'^\times$ and $k^{2\times}$ on the jaws of the thread-clamp K, again opening the same, releasing the thread therefrom and drawing it first under the tension-spring $d^4$ and then under said thread-guide, Fig. 27, after which the latch $t^7$ comes in contact with the rear abutment $t^8$ on abutment-plate $t^{10}$, whereby said latch is shifted from the rear recess into the forward recess in the tail of the upper thread-holder arm $t^3$, which arm is thereby moved away from arm $t^4$ against the stress of spring $d^5$, thus releasing the bobbin-thread; but before this takes place and while the bobbin-thread is held taut by the holder T a threading-hook G passes through the opening $g^0$ in the hinged part $b'$ of the shuttle-holder B, through the thread-eye $d^5$ in the left wall of the shuttle, and through the space $d^6$ between the shuttle-cover and the inner wall of said hinged part $b'$ of the shuttle-holder B to the left of the bobbin-thread, said hook immediately receding, at which moment the thread-holder T releases the thread, thereby drawing said thread from under clip $b^{16}$ and threading the same through the thread-eye $d^5$ of the shuttle, Fig. 29.

The threading-hook G' consists of a bell-crank lever whose arm $g'$ is pivoted at $g^2$ to a lug on the under side of the top plate or table of the machine-frame, said lever-arm being also pivoted to one end of a connecting-rod $g^3$, whose opposite end is pivoted to a rock-lever $g$ on shaft $w^2$, which lever carries a roller $g^5$, held in contact by a spring $b^6$ with a cam $e^7$ on cam-shaft $w'$. To the upper end of the arcuate or segmental arm $g$ of the bell-crank lever is secured the threading-hook G'. (See Figs. 1, 28, and 29.) Immediately after the threading-hook G' has moved back into its normal position below the table of the machine, Fig. 1, the slides B' and O move to the left and right, respectively.

In order to insure the perfect closure of the shuttle—that is, to insure the locking of the cover in the lock-notch usually provided—I employ an auxiliary closer, consisting of an eccentric, cam, or radial arm $l$ on a pin $l'$, that is revoluble in a transverse bearing formed in the enlarged forked head of lever $h'$, in which is carried the shuttle-opener H, said auxiliary closer being arranged on the left of said shuttle-opener, Fig. 13. A spring $l^2$, secured to the radial arm $l$ and to the lever $h'$, tends to hold the arm in a normal down position, Figs. 14 and 30.

As the slide B' moves back from right to left and as the shuttle-holder B is moving under the auxiliary closer the lever $h'$ is depressed by its cam $e^4$, thereby pressing down the auxiliary closer $l$ onto the shuttle-cover $d$ and insuring its being locked to the shuttle.

The object of holding the auxiliary closer in its operative position yieldingly is to enable the shuttle-holder B to move from under it should the lever $h'$ not be lifted in time to move said closer out of the path of said holder.

By means of the mechanisms described the shuttles after leaving the auxiliary closer $l$ are ready for use.

As the carrier-slide B' and shuttle-holder B continue their movement to the left and when they reach a point where the longitudinal axis of the shuttle lies in line with the shuttle-ejector R, or substantially so, the movement of the slide is arrested for a sufficient time for the ejector to eject the shuttle from its holder into a suitable receptacle and move back again into its normal position.

The ejector-rod R is guided in a suitable guide $r^x$, Figs. 1, 2, and 31, which may conveniently be secured to the rear one of the guide-rails $B^2$, the rear end of said rod being pivoted to a rock-lever $r$ on longitudinal shaft $w^4$. The lever $r$ carries a roller $r'$, held in contact with its actuating-cam $e^8$ on the longitudinal cam-shaft $w^3$. Just before the ejector-rod R is moved forward to eject the shuttle the cam $b^4$ on the rear end of the shuttle-holder pintle $b^6$ comes in contact with the left downwardly-projecting curved arm $c^2$ of the lever $c^4$, held in position by said ejector-rod, as hereinbefore described, thereby turning the pintle $b^6$ to move the cam $b^5$ from under the shuttle, and as this takes place the roller $b^8$ on lever $b^7$ is moving to the highest point of the curved inclined track on plate $b^9$ on the front face of the forward one of the guide-rails $B^2$, thus opening the shuttle-holder. At this moment the slide $B'$ remains stationary and the shuttle-ejector R moves forward to eject the shuttle from said holder and immediately recedes again, the slide $B'$ continuing its motion to the left until the open shuttle-holder B again lies under the delivery end of the feed-trough, at which time the right-hand abutment $a^6$ on said slide moves the shuttle-ejector A into the trough $A'$ to eject another shuttle therefrom, said ejector having been retracted from the trough by the action on the radial arm $a^7$ on spindle $a^6$ of the left-hand abutment $a^9$ about the time when the slide $B'$ reached the limit of its movement toward the right or the receiving-table $o$.

As shown in Figs. 1 and 2, all of the principal actuating mechanisms are operated from the continuously-revolving transverse main cam-shaft $w'$, to which the motive power is applied, and the rotation of said shaft is transmitted through a bevel-gear $z'$ on said shaft to the longitudinal cam-shaft $w^3$ through the bevel-gear $z^2$ thereon, there being only three other shafts on which the actuating-levers are mounted — namely, the cross-shaft $w^5$ above the top of the machine, the like shaft $w^2$ near the base of the machine, both shafts parallel with the main cam-shaft $w'$, and the longitudinal shaft $w^4$ parallel with and below the cam-shaft $w^3$.

Having now described my invention, what I claim as new therein, and desire to secure by Letters Patent, is—

1. In a machine such as described, the combination with a shuttle-holder, of feeding devices for feeding shuttles successively to said holder, mechanism for inserting a bobbin into the shuttle held by the holder, and mechanism for moving said holder from the feed mechanism to the bobbin-inserting mechanism, for the purpose set forth.

2. In a machine such as described, the combination with a shuttle-holder, of feeding devices for feeding shuttles successively to the holder, mechanism for inserting a bobbin into the shuttle held by the holder, mechanism for ejecting the shuttle from said holder, and mechanism for moving the shuttle-holder into position for the operation of the aforementioned appliances, for the purpose set forth.

3. In a machine such as described, the combination with a shuttle-holder composed of two parts connected to move toward and from each other, mechanism for feeding a shuttle to the holder, mechanism for moving its parts from each other before a shuttle is fed thereto and for moving said parts toward each other after the feeding of a shuttle to clamp the latter between them, mechanism for inserting a bobbin into the shuttle in the holder and mechanism for moving the shuttle-holder into position for the operation of the aforementioned appliances.

4. In a machine such as described, the combination with a shuttle-holder composed of two parts connected to move toward and from each other, mechanism for feeding a shuttle to the holder, mechanism for moving its parts from each other before a shuttle is fed thereto, and for moving said parts toward each other after the feeding of a shuttle to clamp the latter between them, mechanism for inserting a bobbin into the shuttle held by the holder, means for ejecting the shuttle from the holder after the insertion of a bobbin and after said parts of the holder have again been moved from each other to release the filled shuttle and receive an empty one, and mechanism for moving the holder into position for the operation of the aforesaid appliances, for the purpose set forth.

5. A machine such as described, comprising a shuttle-holder, mechanism for inserting a bobbin into a shuttle held by said holder, mechanism for threading the bobbin-thread first under the tension-spring on the shuttle-cover, then through the thread-eye of the shuttle, an ejector for ejecting the shuttle from the holder after the insertion of the bobbin and the threading of the thread thereof, and mechanism for moving the shuttle-holder into position for the operation of the aforementioned appliances, for the purpose set forth.

6. A machine such as described, comprising a shuttle-holder, mechanism for opening a shuttle held by said holder, mechanism for inserting a bobbin into such shuttle, mechanism for closing the shuttle after the insertion of the bobbin, and mechanism for threading the bobbin-thread first under the tension-spring on the shuttle-cover and then through the thread-eye of the shuttle, for the purpose set forth.

7. A machine such as described, comprising a shuttle-holder, mechanism for feeding a shuttle thereto, mechanism for inserting a bobbin into such shuttle, mechanism for threading the bobbin-thread first under the tension-spring on the shuttle-cover, then through the thread-eye of the shuttle, and mechanism for moving the shuttle-holder into position for the operation of the aforementioned appliances, for the purpose set forth.

8. A machine such as described, comprising a shuttle-holder, mechanism for opening a shuttle held thereby, mechanism for inserting a bobbin into the open shuttle, shuttle-closing appliances, and mechanism for threading the bobbin-thread under the tension-spring on the shuttle-cover and through the thread-eye of the shuttle, of an auxiliary shuttle-closer acting upon the shuttle-cover after being closed down and after the threading of the bobbin-thread, and mechanism for moving the shuttle-holder into position for the operation of the aforementioned appliances, for the purpose set forth.

9. A machine such as described, comprising a shuttle-holder, a bobbin-carrier, a receiving-table proximate thereto, and mechanism for transferring a bobbin from said carrier onto said receiving-table; in combination with a thread-clamp for clamping the bobbin-thread, means for periodically opening and closing said clamp, mechanism for transferring a bobbin from the table into a shuttle held by the aforesaid holder, mechanism for taking the bobbin-thread from the clamp and threading said thread under the shuttle tension-spring and through the thread-eye of such shuttle, and mechanism for moving the shuttle-holder into position for the operation of the aforementioned appliances, for the purpose set forth.

10. A machine such as described, comprising a shuttle-holder, shuttle-feeding devices organized to feed shuttles one after another to said holder, mechanism for inserting a bobbin into a shuttle held by said holder, mechanism operating to thread the bobbin-thread under the shuttle tension-spring and then through the thread-eye of the shuttle, and mechanism for moving the shuttle-holder from the shuttle-feeding devices to the bobbin inserting and threading appliances and vice versa, for the purpose set forth.

11. A machine such as described, comprising a shuttle-holder, shuttle-feeding devices organized to feed shuttles one after another to said holder, a shuttle-opener, mechanism for inserting a bobbin into an open shuttle held by said holder, a shuttle-closer and mechanism for threading the bobbin-thread under the shuttle tension-spring and through the eye of the shuttle; in combination with mechanism for moving the shuttle-holder from the feed devices first to the shuttle-opener, then to the bobbin-inserting, shuttle closing and threading appliances, and back to said feed devices, said mechanism organized to hold the shuttle-support stationary during the operation of the aforementioned appliances, for the purpose set forth.

12. In a machine such as described, the combination with a shuttle-holder, of shuttle-feeding appliances operating to feed shuttles one after another to said holder, shuttle-opening mechanism, mechanism for inserting a bobbin into an open shuttle in the holder, mechanism for closing the shuttle, mechanism for threading the bobbin-thread under the shuttle tension-spring and through the thread-eye in the shuttle, mechanism for ejecting said shuttle from its holder, and mechanism organized to move the shuttle-holder from the shuttle-feed devices to the aforementioned appliances in the order set forth and back again to said shuttle-feeding devices, for the purposes specified.

13. In a machine such as described, the combination with a shuttle-holder, shuttle-feeding devices operating to feed shuttles one after another to said holder, shuttle-opening mechanism, mechanism for inserting a bobbin into an open shuttle held by the holder, mechanism for closing the shuttle, mechanism for threading the bobbin-thread under the shuttle tension-spring and through the thread-eye of the shuttle, an auxiliary shuttle-closer, an ejector for ejecting a shuttle from its holder, and ejector-actuating mechanism; of mechanism organized to move the shuttle-holder from the shuttle-feeding devices successively to the aforementioned appliances and then back to said feeding devices, for the purposes set forth.

14. A machine such as described, comprising a shuttle-holder, a thread-clamp adapted to hold the thread of a bobbin, mechanism for inserting a bobbin into a shuttle held by the shuttle-holder while said thread is held by the clamp, mechanism for closing the shuttle, a thread-holder organized to seize the thread held by said clamp, release said thread therefrom, thread the same under the shuttle tension-spring and hold said thread taut, mechanism for actuating the thread-holder, a threading-hook adapted to pass through the thread-eye of the shuttle above its cover, seize the thread held by the aforesaid holder and thread it through said eye, means for releasing the thread from its holder when said hook seizes it, and mechanism for actuating the threading-hook, for the purposes set forth.

15. In a machine such as described, the combination with a shuttle-holder and an inclined feed-trough open at its delivery end and provided thereat with a yielding stop to prevent the shuttle at said end from dropping out; of a shuttle-ejector having motion into and out of said trough near said delivery end in a plane between the longitudinal axial plane of the shuttle at that end and the adjacent shuttle, mechanism for moving the shuttle-holder to and from the feed-trough, and shuttle-ejector-actuating appliances controlled by the movements of said shuttle-holder, for the purpose set forth.

16. In a machine such as described, the combination with the shuttle-holder composed of a fixed and a movable part, the latter movable from and toward the former for the introduction and clamping of a shuttle between them, a support to which said fixed part of the holder is secured, and a spring on said support acting upon the movable part to move the same toward the fixed part; of shuttle-feeding appliances operating to feed a shuttle to the holder when in position to receive it, mechanism acting upon the movable part of the holder to move the same against the stress of its spring away from the fixed part when the holder is in the aforesaid position and to release said movable part to allow the spring to close it upon the shuttle when the holder is moved out of its said position, and mechanism connected with the support for the holder and operating to move the latter into and out of its said positions, for the purpose set forth.

17. In a machine such as described, the combination with the shuttle-holder composed of a fixed and a movable part, the latter movable from and toward the former for the introduction and clamping of a shuttle between them, a support to which said fixed part of the holder is secured and a spring on said support acting upon the movable part to move the same toward the fixed part; of shuttle-feeding appliances operated by the aforesaid support, operating to feed a shuttle to the holder when in position to receive it, mechanism acting upon the movable part of the holder to move the same against the stress of its spring away from the fixed part when the holder is in the aforesaid position and to release said movable part to allow the spring to close it upon the shuttle when the holder is moved out of its said position, and mechanism connected with the support for the holder and operating to move the latter into and out of its said positions, for the purpose set forth.

18. In a machine such as described, the combination with a shuttle-holder composed of a fixed and a movable part, the latter movable from and toward the former for the introduction and clamping of a shuttle between them, a support to which said fixed part is secured, a spring on said support acting upon the movable part of the holder to move the same toward the fixed part, and a cam or eccentric revoluble between the said parts of the holder; of shuttle-feeding appliances operating to feed a shuttle to the holder when in position to receive it, mechanism acting upon the movable part of said holder to move the same against the stress of its spring away from the fixed part when the holder is in the aforesaid position and to release said movable part to allow the spring to close it upon the shuttle when the holder is moved out of its said position, mechanism for revolving the aforesaid cam so as to support the shuttle from below when the movable part of the holder is closing upon said shuttle, and mechanism for moving the support of the shuttle-holder into and out of its said positions, for the purpose set forth.

19. In a machine such as described, the shuttle-holder B, a support therefor, said holder composed of a fixed part $b^2$ secured to said support and provided with the finger $b^{21}$ at its rear end, the part $b'$, the pintle $b^6$ on which part $b'$ is pivoted, the radial arm $b^4$ and cam $b^5$ secured to, and the lever $b^7$ loose on said pintle, said lever pivoted to part $b'$ and carrying a roller $b^8$ at its opposite end; in combination with the inclined track $b^9$ in the path of the aforesaid roller $b^8$, the lever $c^4$, means for holding one of its arms always in the path of arm $b^4$, shuttle-feeding appliances and mechanism for moving the shuttle-holder support from and to said feeding appliances substantially as and for the purpose set forth.

20. In a machine such as described, the combination with a shuttle-holder and its support provided with two abutments at suitable points and an inclined shuttle-feed trough provided at its open delivery end with a resilient shuttle-stop and the guide-plate $a^3$; of a shuttle-ejector consisting of a spindle $a^6$ the radial arm $a^7$ thereon in the path of the aforesaid abutments, the radial arm $a^5$ carrying the plate $a^4$, the ejector-fingers $a'$ projecting from said plate into apertures in plate $a^3$ and mechanism for moving the shuttle-holder support to bring one or the other abutment thereon to act on the aforementioned radial arm $a^7$, for the purpose set forth.

21. In a machine such as described, the combination with a two-part shuttle-holder adapted to open and close, a support for said holder provided with two abutments at suitable points, and an inclined shuttle-feed trough provided at its delivery end with a resilient shuttle-stop; of a shuttle-ejector, mechanism operated by the aforesaid abutments to move the ejector into the feed-trough to eject a shuttle therefrom when the holder has moved in position to receive such shuttle, and to withdraw the ejector from said trough when the shuttle-holder moves away, mechanism for opening the shuttle-holder as it is moved into position to receive a shuttle, mechanism for closing the shuttle-holder upon the shuttle when said holder moves away from the trough, and mechanism for moving the shuttle-holder support to and from said trough, for the purpose set forth.

22. The combination with the shuttle-holder, of a shuttle-opener provided with a nose adapted to enter a recess in the forward or free end of the cover of a shuttle held by said holder, mechanism organized to move the opener downwardly toward the shuttle-holder with its nose in the aforesaid recess, then move said opener upwardly or away from the holder and rearwardly toward the hinge of the cover and back again, and mechanism organized to move the shuttle-holder in one direction into position to enable the aforesaid nose of the opener to pass into the recess in the shuttle-cover, then move said holder in reverse direction to turn the opener-nose under the shuttle-cover before the opener moves upwardly and rearwardly, and means for turning the opener back into a normal position when it reaches or is about to reach the limit of its upward motion, for the purpose set forth.

23. The combination with the shuttle-holder, of a shuttle-opener provided with a nose adapted to enter a recess in the forward or free end of the cover of a shuttle held by said holder, mechanism organized to move the opener downwardly toward the shuttle-holder with its nose in the aforesaid recess, then move said opener upwardly or away from the holder and rearwardly toward the hinge of the cover and back again, and mechanism organized to move the shuttle-holder in one direction into position to enable the aforesaid nose of the opener to pass into the recess in the shuttle-cover, then move said holder in reverse direction to turn the opener-nose under the shuttle-cover before the opener moves upwardly and rearwardly, means for locking the opener against turning, and means for releasing and for turning the opener back into a normal position when it reaches or is about to reach the limit of its upward motion, for the purpose set forth.

24. The combination with the shuttle-holder B, its support B', the spring-controlled rock-lever $b^{13}$ connected therewith, and the cam $e^3$ actuating said lever; of the spring-controlled rock-lever $h^2$, its actuating-cam $e^4$, the rock-shaft $w^5$ the rock-lever $h'$ thereon terminating in a forked head, the shuttle-opener H revoluble in bearings in said forked head and carrying a sleeve $h^{11}$ between the arms of the fork, said sleeve provided with radial pins $h^{10}$ $h^{20}$, the latter pin connected by spring with lever $h'$, the lever H' on a vertical pivot secured to lever $h'$, the arm $h^5$ of said lever forked and straddling opener H between two collars, and the slotted fixed bracket $h^8$ into the slot of which projects the arm $h^6$ of said lever H', substantially as and for the purpose set forth.

25. In a machine such as described, the combination with the shuttle-holder B, its slide B', the spring-controlled lever $b^{13}$ connected with said slide, the cam $e^3$ actuating said lever, the forked lever $h'$, the spring $h^9$ secured to its under face, the spring-controlled lever $h^2$ connected with lever $h'$, the cam $e^4$ actuating lever $h^2$, the shuttle-opener H loose in bearings in the fork of lever $h'$ and carrying a sleeve $h^{11}$ between the arms of such fork, said sleeve provided with two radial pins $h^{10}$, $h^{20}$, and a spring connecting pin $h^{20}$ with lever $h'$; of the rock-lever H' on said lever $h'$ connected with rod H, the fixed and slotted arm $h^8$ into whose slot one of the arms of the lever H' projects, and the fixed abutment-standard $h^{13}$ projecting into the path of the free end of spring $h^9$ on lever $h'$, substantially as and for the purpose set forth.

26. In a machine such as described, the combination with the shuttle-holder B, its slide B', the spring-controlled lever $b^{13}$ connected with said slide, the forked lever $h'$, the spring-controlled lever $h^2$ connected with lever $h'$, the cam $e^4$ actuating lever $h^2$; of the spring-controlled auxiliary shuttle-closer $l$ loosely mounted in a bearing in the forked head of lever $h'$, substantially as and for the purpose set forth.

27. The combination of the shuttle-feed trough A', the shuttle-ejector mechanism A, and the spring $a^{10}$ secured to the bearing of spindle $a^6$ of said mechanism, with the shuttle-holder B, the mechanism for moving the shuttle to and from the feed-trough, and the mechanism for opening the shuttle-holder as it reaches said feed-trough, for the purpose set forth.

28. The combination with a shuttle-holder, a bobbin-carrier consisting of a wheel provided in its rim with bobbin-seats parallel with its axis of rotation, mechanism for imparting to said carrier a periodical progressive rotation, a receiving-table proximate to the rim of the carrier, a bobbin-ejector, and mechanism for actuating the same to eject a bobbin from its seat when in line with the receiving-table; of a presser-bar, mechanism for moving the bar into contact with a bobbin in the receiving-table, a push-bar, mechanism for moving the same to push the bobbin over the edge of the receiving-table into an open shuttle held by the shuttle-holder, and mechanism for moving said shuttle-holder to and from the receiving-table, for the purpose set forth.

29. The combination with a shuttle-holder, a bobbin-carrier consisting of a wheel provided in its rim with bobbin-seats parallel with its axis of rotation, mechanism for imparting to said carrier a periodical progressive rotation, a receiving-table proximate to the rim of the carrier, a bobbin-ejector, and mechanism for actuating the same to eject a bobbin from its seat when in line with the receiving-table; of a spring-controlled presser-lever, and a push-bar, a spindle on which both are loosely mounted, a support for said spindle, means for locking the presser-lever against motion under the stress of its spring, mechanism for releasing the presser-lever when moved over a bobbin on said table with the push-bar behind said bobbin, mechanism for moving the said spindle-support toward and from said table to push the bobbin over the edge thereof, and mechanism for moving the shuttle-holder into position so that the bobbin pushed over the receiving-table may drop into an open shuttle held by said holder, for the purpose set forth.

30. The combination with a shuttle-holder, a circular revoluble bobbin-carrier, a receiving-table proximate thereto, mechanism for periodically imparting a partial rotation to the carrier, means for transferring a bobbin from the latter onto the receiving-table, a thread-clamp, means for opening the jaws thereof when a bobbin is transferred from the carrier so that its thread will lie between said jaws, means for closing said jaws, means for holding the bobbin on and for pushing the same over the edge of said table, mechanism for moving the shuttle-holder into position to enable the bobbin pushed over the table to drop into an open shuttle held by said holder; and mechanism for closing the shuttle after the bobbin has dropped into it; of means for swinging the thread-clamp away from the shuttle-holder to draw out the bobbin-thread, a thread-holder consisting essentially of nipping-jaws, mechanism organized to open said jaws, move the thread-holder into position to seize the thread held by the thread-clamp, open the jaws thereof and close the nipping-jaws of said thread-holder, and to move the latter away from said clamp in position to draw the thread under a tension-spring on the shuttle-cover, and a thread-guide on the shuttle-support at the hinge end of the shuttle-cover, a threading-hook, and mechanism for moving said hook through an opening in the shuttle-holder, through the thread-eye and cover of the shuttle into position to seize the thread held by the thread-holder and back again, whereby said thread is threaded through said thread-eye of the shuttle, and means for simultaneously opening the nipping-jaws of the thread-holder, substantially as described.

31. The combination with the revoluble bobbin-carrier M, provided with bobbin-seats $m^2$, the ratchet-wheel $m^3$ rigidly connected with said carrier, the pawl-arm $m^4$, the spring-controlled lever $m^5$ connected therewith, the actuating-cam $e^5$ for said lever, the receiving-table $o$, ejecting appliances operating to eject a bobbin from the carrier onto said table $o$ when a bobbin-seat has been moved in line therewith, a shuttle-holder, and mechanism for moving the same to and from table $o$; of the spring-controlled presser-lever E', the push-lever E, their supporting-spindle, the roller $f^0$ against which the tail of the presser-lever is held by its spring, the swiveled clamp K, the clamp-opener $k^5$, the slide O on which said devices are supported, mechanism for moving said slide toward and from the delivery-table $o$, and the fixed plate $k^3$ provided with the slot $k^{18}$ for the pin $k^9$ on arm $k^{19}$ projecting from the swivel-head of clamp K, said parts organized for operation substantially as and for the purpose set forth.

32. The combination with the revoluble bobbin-carrier M provided with bobbin-seats $m^2$, mechanism for periodically imparting to said carrier a partial rotation, the receiving-table $o$, ejecting appliances operating to eject a bobbin from the carrier onto said table, when a bobbin-seat is moved in line therewith, a shuttle-holder, and mechanism for moving the same to and from table $o$, the presser-lever E', the push-lever E, the clamp K, the slide O on which said parts are supported, the mechanism for operating the presser-lever and clamp, and the mechanism for moving the slide to and from the table $o$; of the thread-holder T constructed and operating as described, the vertical spindle $w^6$, the radial arm 4 at its upper end to which said holder is secured, said spindle carrying near its lower end a sleeve $s^2$ having cam-face $s^3$, the sleeve-step $s$ for said spindle having cam-face $s'$ coöperating with cam-face $s^3$ and means for oscillating said spindle, substantially as and for the purpose set forth.

33. The combination with the revoluble bobbin-carrier M provided with bobbin-seats $m^2$, mechanism for periodically imparting to said carrier a partial rotation, the receiving-table $o$, ejecting appliances operating to eject a bobbin from the carrier onto said table when a bobbin-seat is moved in line therewith, a shuttle-holder, and mechanism for moving the same to and from table $o$, the presser-lever E', the push-lever E, the clamp K, the slide O on which said parts are supported, the mechanism for operating the presser-lever and clamp, and the mechanism for moving the slide to and from the table $o$; of the thread-holder T constructed and operating as described, the vertical spindle $w^6$, the radial arm 4 at its upper end to which said holder is secured, said spindle carrying near its lower end a sleeve $s^2$ having cam-face $s^3$, the sleeve-step $s$ for said spindle having cam-face $s'$ coöperating with cam-face $s^3$, the radial arm on spindle $w^6$, the spring-controlled lever $m^5$, its actuating-cam $e'$ and the connecting-rod $s^6$ connecting radial arm $s^5$ with said lever, substantially as and for the purpose set forth.

34. A machine for inserting bobbins into shuttles and threading the latter, comprising a shuttle-holder, mechanism for feeding a closed shuttle thereto, mechanism for opening a shuttle held by said holder, a bobbin-carrier mechanism for transferring a bobbin from the carrier into an open shuttle when in position to receive it, mechanism for closing the shuttle after the insertion of the bobbin, mechanism for threading the bobbin-thread under the tension-spring on the cover of said shuttle and through its thread-eye, mechanism for ejecting the shuttle from its holder, a slide on which the shuttle-holder is supported, and mechanism connected with the slide and organized to move the shuttle-holder from the shuttle-feed devices to the shuttle-opener, then to the bobbin-inserting, shuttle closing and threading appliances, back toward the shuttle-feeding mechanism to the shuttle-ejector, and finally back to the said feeding devices, for the purposes set forth.

35. A machine for inserting bobbins into shuttles and threading the latter, comprising a shuttle-holder, mechanism for feeding a closed shuttle thereto, mechanism for opening a shuttle held by said holder, a bobbin-carrier, mechanism for transferring a bobbin from the carrier into an open shuttle when in position to receive it, mechanism for closing the shuttle after the insertion of the bobbin, mechanism for threading the bobbin-thread under the tension-spring on the cover of such shuttle and through its thread-eye, auxiliary shuttle-closing appliances, mechanism for ejecting the shuttle from its holder, a slide on which the shuttle-holder is supported, and mechanism connected with the slide and organized to move the shuttle-holder from the shuttle-feed devices to the shuttle-opener, then to the bobbin-inserting, shuttle closing and threading appliances, back toward the shuttle-feeding mechanism, to the shuttle-ejector, and finally back to the said feeding devices, for the purposes set forth.

36. In a machine such as described, the combination with a shuttle-holder, mechanism for inserting a bobbin into an open shuttle held thereby, mechanism for closing down the shuttle-cover, and mechanism for moving the shuttle-holder to and from said appliances; of a fixed guard projecting across the open end of the holder during the operation of the shuttle-closing mechanism, for the purposes set forth.

In witness whereof I have hereunto set my hand in presence of two witnesses.

JOHAN JAKOB SONDEREGGER.

Witnesses:
FRITZ STEINER,
CAESER LOEB.